United States Patent Office 3,204,947
Patented Sept. 7, 1965

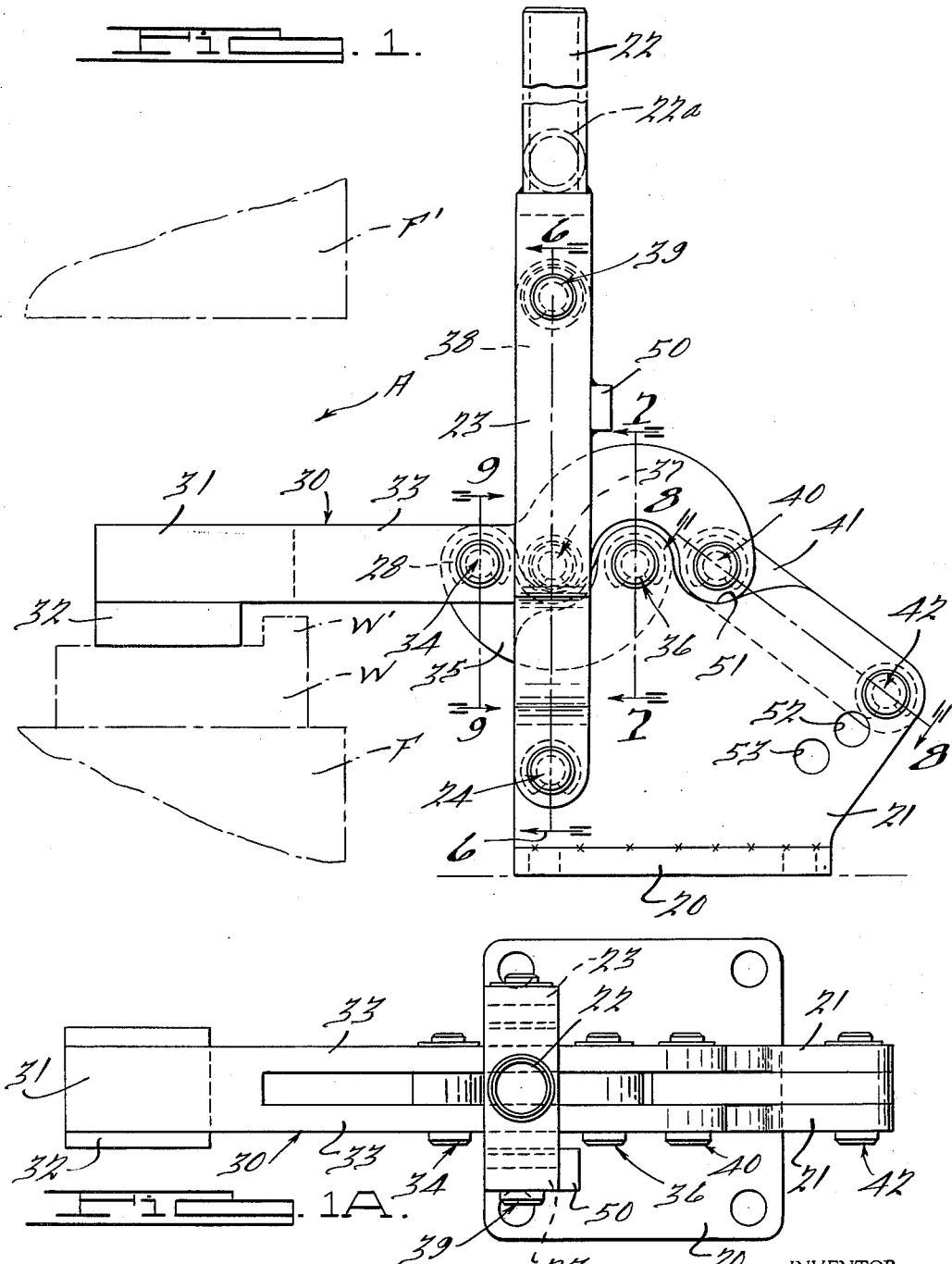

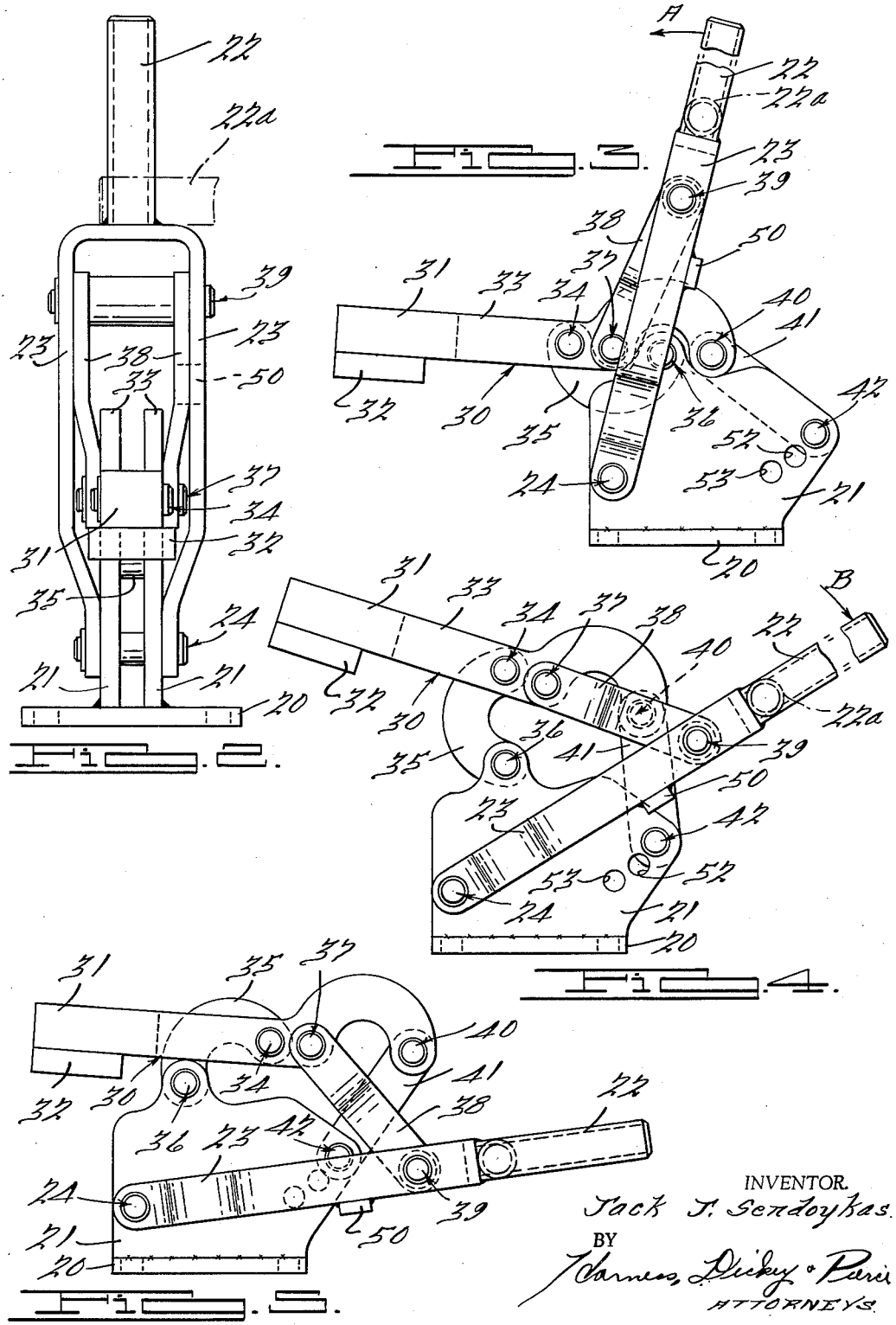

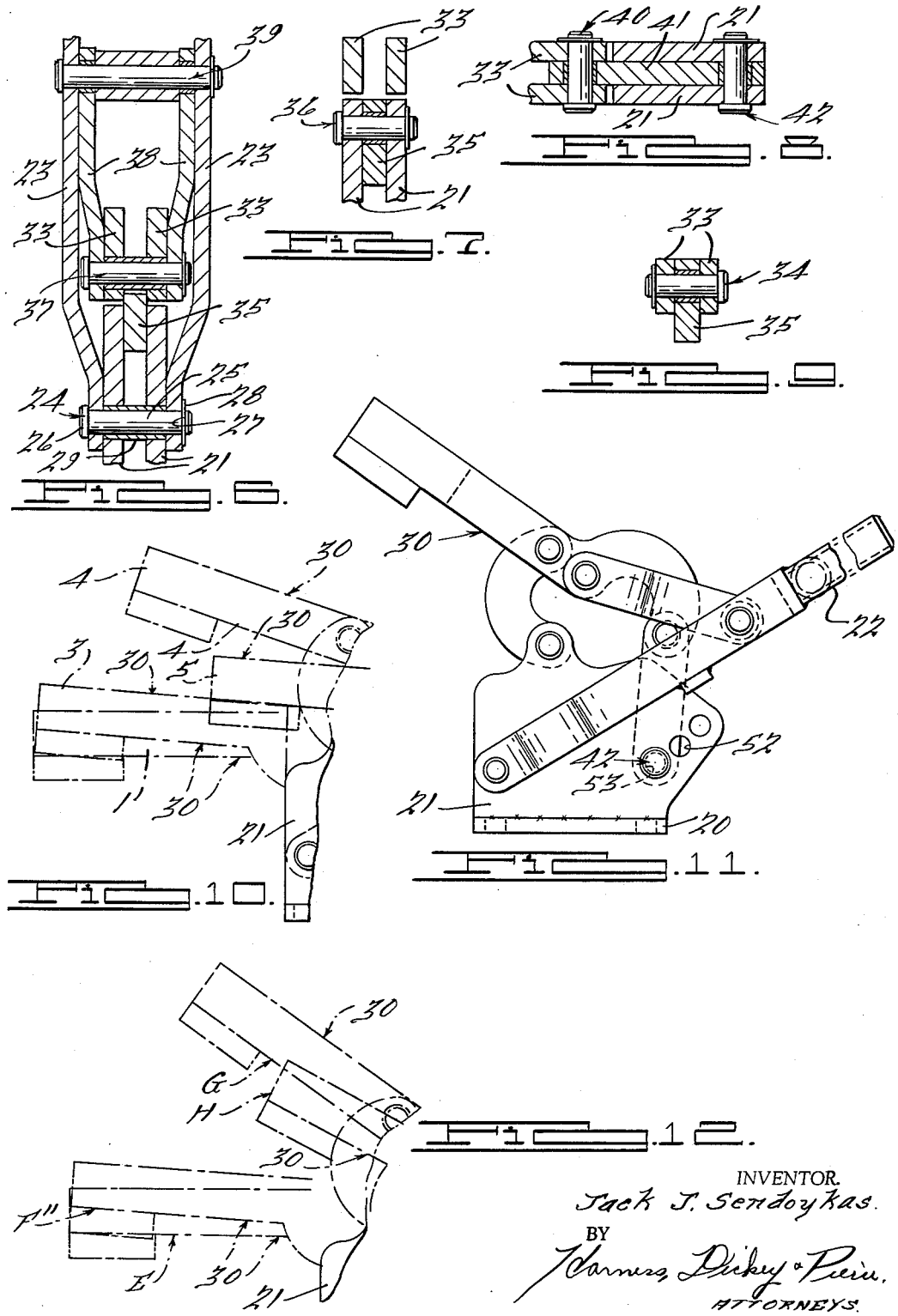

3,204,947
TOGGLE CLAMP
Jack J. Sendoykas, 32001 E. Jefferson Ave., Apt. 1,
St. Clair Shores, Mich.
Filed Aug. 1, 1963, Ser. No. 299,353
9 Claims. (Cl. 269—94)

This invention relates to clamps and, more particularly, to a toggle type clamp having a reciprocating clamp bar.

Prior art clamps of this general type have the disadvantage that the clamping bar swings from the clamping position in an arc which requires considerable head room in order for the clamping bar to clear flanges or other protruding structure of the work holding fixture. In practice, however, the overhead clearance frequently is inadequate and the clamps simply cannot be used under these conditions. Also, in some installations it is desirable for the clamp bar to clear the fixture rapidly without moving through a complete 180° arc, particularly if the clearances back of the unit are limited. This is not possible with conventional clamps.

It is, therefore, an important object of this invention to provide a clamp of this type having a clamp bar which rocks on an essentially fixed pivot mounting in such a way that the clamping end of the bar first lifts relatively rapidly off the workpiece to clear flanges or other protruding parts and then retracts rapidly horizontally with very little rise to an unclamped position, so that the clamp will function under minimum overhead clearance conditions.

It is also an object of this invention to provide a clamp of this type wherein the pivot mounting for the clamp bar is adjustable to modify the action of the clamp bar so that the clamping end thereof rises higher and more rapidly during the initial unclamping operation and does not retract as far so that the clamp can be adapted to conditions where the work flanges or other obstructing structure is relatively high or where clearance back of the unit is limited.

Another object of this invention is to provide a clamp of this type having a minimum number of component parts as to approach the ultimate in structural simplicity.

Another object of the invention is to provide a device of this type wherein the structural simplicity of the clamp results in an economy in its manufacture, assembly and maintenance.

Still another object is to provide a clamp of this type which may be quickly and easily locked in clamped position to rigidly hold the workpiece and which may be just as quickly released to unclamped position thereby rendering the device suitable for use in mass production operations.

The various objects and advantages, and the novel details of construction of one commercially practical embodiment of the invention, will become more apparent as this description proceeds, especially when considered in connection with the accompanying drawings, in which:

FIGURE 1 is a side elevational view of a clamp constructed in accordance with this invention, a conventional type of workpiece and work holding fixture being shown in phantom lines;

FIGURE 1A is a top plan view of the structure illustrated in FIGURE 1;

FIGURE 2 is an elevational view taken at right angles to FIGURE 1, looking from the left side;

FIGURE 3 is a view similar to FIGURE 1 with the parts in the position they assume just prior to clamping position, with the handle being moved in the direction of the arrow A;

FIGURE 4 is a similar view with the parts in an intermediate position, the handle moving in the direction of arrow B;

FIGURE 5 is a similar view with the parts in completely unclamped position;

FIGURE 6 is a fragmentary sectional view taken substantially on the plane indicated by line 6—6 in FIGURE 1;

FIGURE 7 is a similar view taken on line 7—7 in FIGURE 1;

FIGURE 8 is a similar view taken on line 8—8 in FIGURE 1;

FIGURE 9 is a detail sectional view taken on line 9—9 in FIGURE 1;

FIGURE 10 is a composite view diagrammatically illustrating the positions of the clamping arm in the several positions of the clamp.

FIGURE 11 is a view similar to FIGURE 4 in which the lower pivot of the actuating link has been adjusted to cause a more rapid use of the clamp arm; and FIGURE 12 is a view similar to FIGURE 10 showing the positions of the clamping arm in the several positions of the clamping arm with the lower pivot adjusted as shown in FIGURE 11.

While obviously the clamp or clamping device of this invention may be employed with equal facility in various environments, there is illustrated in phantom lines in FIGURE 1 one environment in which this invention may be used effectively. In FIGURE 1, a fixture is indicated by the reference character F and the workpiece adapted to be clamped thereon is indicated by the reference character W. As incident thereto, the workpiece W is shown with an upwardly extending ledge W' which must be cleared by the clamp as it moves into clamping and unclamping positions. As further indicating the difficulties sometimes encountered, the fixture F is shown as provided with an upper structure F' providing a space A of limited vertical dimension between the fixture F and the portion F' in which the work W rests and in which the clamp of this invention must operate. Conventional clamps which are movable solely on a constant radius arc would be unable to clear the upper fixture portion F' to enter the opening or aperture A. Moreover, there are many instances where clearance behind the clamping device is limited, and the prior art clamps which usually travel in a complete arc cannot be used with facility. While one typical environment has been shown and described, it will be understood that the clamp may be used in many different environments where the use of ordinary prior art clamps is not feasible.

The clamp or clamping device of this invention comprises a base 20 provided with a pair of spaced sides 21. The reference character 22 indicates a handle portion provided with a bifurcated portion consisting of a pair of spaced arms 23 which straddle the sides 21 of the base 20, and the ends of these arms 23 are pivotally connected to the base as indicated at 24.

It might be noted here that all of the pivotal connections provided in this device may be, and preferably are, composed of a headed rod or bolt, such as 25, provided with a head 26 on one end and a slot 27 on the other end with which a snap ring or washer 28 engages. This enables the device to be quickly assembled or disassembled. In the connection just described, a bushing 29 forms the bearing surface between the bolt 25 and the sides 21 of the base 20. Similar constructions are used at the other pivotal connections.

While in FIGURE 1 the handle or grip portion 22 extends in a vertical direction, it may be arranged at right angles to the leg portions 23, if desired, as shown in dot-and-dash lines at 22a in FIGURE 2.

The reference character 30 indicates a clamp or clamping arm. This clamping arm may be provided with a portion of 31 of solid cross section to which, if desired, a clamping pad or work engaging member 32 may be secured. The portion 31 of solid cross section will be referred to as the forward end of the clamping arm 30. The rear end of the clamping arm is bifurcated to form a pair of laterally spaced arms 33. The clamping arm 30 is pivotally connected as at 34 to the free ends of a first link 35 which, as shown, is of semicircular configuration and has its other end pivotally connected as at 36 to the side plates 21 of the base 20. The first link 35 is semicircular or arcuate in plan view so as to clear the pivotal connection 37 with the ends of a pair of actuating links 38 which are pivotally connected by a pivot 39 with the legs 23 of the operating handle 22. The rear ends of the arms 33 of the clamping arm 30 are also shown as of semicircular or arcuate configuration to clear the pivot 36. The arcuate configuration of the links 35 and of the rear ends of the clamping arm 30 permits these parts to be compactly arranged, as shown. The ends of these arms 33 are connected by a pivot 40 with the upper ends of a link 41, the other end of which is pivoted as at 42 to the side plates 21 of the base 20.

The first link 35 and the second link 41 constitute a pair of substantially parallelogram links which, during the unclamping operation of the clamping bar 30, act to first raise said clamping bar to clear the workpiece and then longitudinally retract the clamping arm while imparting thereto an arcuate movement, as will be described more fully hereinafter.

While the rear ends of the arms 33 of the clamping bar 30 have been shown to be of curved or arcuate configuration so as to clear the pivot 36, they may be formed straight as continuations of the straight portions of the arms 33. In this instance, however, it would be necessary to spread the rear ends of the arms 33 so as to lie on the outside of the plates 21 of the base 20, the arms being spaced apart sufficiently to clear the protruding ends of the pivots 37 and 36.

As the handle 22 is brought to the position illustrated in FIGURE 1, the pivots 24, 37 and 39 move through an aligned condition to an over center position in which the middle pivot 37 is slightly to the right as viewed in FIG. 1 of a line connecting the end pivots 24 and 39 whereby to hold the locking bar 30 in clamped position. Continued movement of the handle 22 to the left beyond the fully clamped position is prevented by engagement of a laterally projecting stop 50 on one of the legs 23 with one of the actuating links 38.

Just prior to the time the clamping bar 30 moves to the fully clamped position, the ends of the legs 33 at the pivot 40 engage seats 51 formed in the side plates 21. This limits counter clockwise movement of the second link 41 on the fixed pivot 42 so that during final clamping movement the clamping arm 30 swings on the pivot 40 to effect a rapid downward movement of the clamping pad 32.

In order to provide a higher and more rapid rise and a shorter rearward movement of the clamping arm 30 and particularly of the clamping pad 32 during unclamping, which becomes important, for example, when the work flange W' is higher than shown or where clearance back of the unit is limited, the pivot 42 of the second link 41 is adjustable in any one of a number of spaced openings 52, 53, etc. provided in the side plates 21 of the base 20. Maximum rise of the clamping bar 30 is achieved by positioning the pivot 42 in the apertures 53, as shown in FIGURE 11. On the other hand, if the pivot 42 is positioned in the aperture 52, the clamping arm 30 rises higher and has a shorter retroactive movement than if the pivot is in the uppermost aperture as shown in FIGURE 1, but it does not rise as high and it retracts farther than if the pivot 42 is in the aperture 53.

Obviously, any desired number of additional apertures may be provided to further modify the action of the clamping arm 30 and the function of the device. The apertures 52, 53, etc. as well as the apertures for the pivot 42, shown in the other figures, are located on an arc struck from the pivot 40 when the rear ends of the legs 33 bear on the seats 51. Thus, the legs 33 engage the seats 51 during the final clamping action in any adjusted position of the pivot 42.

FIGURE 10 illustrates the action of the clamping bar 30 when the pivot 42 is in the topmost aperture as shown in FIGURES 1, 3, 4, and 5 and these positions have been numbered in accordance with the sequence of movement. Thus, during unclamping, the arm 30 moves from the fully clamped position indicated by the numeral 1 substantially vertically to the position indicated by the numeral 3. It then moves in an arcuate path upwardly and longitudinally in a retracting direction to the positions indicated by the numeral 4 and when the handle 22 is brought fully back it drops to the position indicated by the numeral 5. As suggested this action is accomplished by rocking the handle 22 from the position shown in FIGURE 1 to the position shown in FIGURE 5.

If the pivot 42 is positioned in the aperture 53, the clamping end of the arm 30 rises more rapidly and higher. More specifically the arm 30 moves progressively from the position E through the positions indicated by the reference characters F' and G to the position designated by the reference character H. As suggested, this modified movement of the clamping arm 30 becomes important where clearance back of the unit is limited and where it is necessary for the clamping arm to clear the workpiece and the fixture without moving it through a full 180° movement.

It will be noted that when the handle 22 is moved from the position illustrated in FIGURE 1 through its several positions to the position illustrated in FIGURE 5, the links 35 and 41 act as a pair of substantially parallelogram links to impart first a lifting movement to the clamping arm and then a compound retracting and arcuate movement. The lifting movement is sufficient to cause the clamping pad or work engaging member 32 to clear, for instance, the ledge W' on the workpiece W and the compound reciprocating and arcuate movement causes the clamping arm to be withdrawn through the opening A while clearing the overhead obstruction F' of the fixture.

By providing the pivot 42 with a snap washer 28, this pivot may be readily changed to any one of the openings 52, 53, etc., so that the device may be readily adapted for any environment in which it is involved.

When the clamping bar 30 is moved to its clamping position, the handle is in substantially the position illustrated in FIGURE 1, in which the stop 50 engages the adjacent link 38 to hold the pivots 24, 37 and 39 in substantially vertical alignment or slightly over dead center to positively hold the working bar 30 in its clamped position.

It is believed that from the foregoing the operation and advantages of this improved clamping device will be readily understood. It provides a simple but efficient means for positively clamping various types of workpieces in environments in which entrance space for the clamp member and overhead clearance are important factors. With a clamp of this type, workpieces may be clamped in associated structure, with which the ordinary clamps of the prior art would be impractical. Moreover, the structural simplicity of the clamp creates an economy in its manufacture, assembly and maintenance.

While one commercially practical embodiment of the invention has been described and illustrated herein somewhat in detail, it will be understood that various changes may be made as may come within the purview of the accompanying claims.

What is claimed is:

1. A clamping device of the class described comprising, a base, a handle pivotally mounted on said base, a clamping arm, a pair of cooperating links connecting said clamping arm to said base, an actuating link connecting said clamping arm to said handle at a point intermediate the pivotal connections of said links thereto, and a seat on said base adapted to be engaged by the pivotal connection between said clamping arm and one of said links just prior to the movement of said clamping arm into clamped position.

2. In a clamping device of the class described, a base, a handle pivotally mounted on said base, a clamping arm, a pair of cooperating links connecting said clamping arm to said base for imparting compound reciprocating and arcuate movement to the clamping arm, and an actuating link pivotally connected to said handle and clamping arm, said handle being movable to a position wherein the pivots of said actuating link are brought into substantial alignment with the pivotal connection between said handle and base to lock said clamping arm in clamped position.

3. A device as described in claim 2 in which said handle is provided with a stop adapted to engage said actuating link to position the pivots of said actuating link slightly past dead center with the pivotal connection between said handle and base.

4. A clamping device of the class described comprising, a base, a handle having a bifurcated portion straddling said base and pivotally connected thereto, a clamping arm, a first connecting link, and a second connecting link, means pivotally connecting corresponding ends of said links to said clamping arm and to said base so that said links move substantially as a parallelogram to impart a compound reciprocating and arcuate movement to said clamping arm, and an actuating link pivotally connected to said handle and to said clamping arm to move the latter to clamped and released positions.

5. A clamping device of the class described comprising, a base, a handle having a bifurcated portion straddling said base and pivotally connected thereto, a clamping arm, a first connecting link, and a second connecting link, means pivotally connecting corresponding ends of said links to said clamping arm and to said base so that said links move substantially as a parallelogram to impart a compound reciprocating and arcuate movement to said clamping arm, an actuating link pivotally connected to said handle and to said clamping arm to move the latter to clamped and released positions, and means for varying the location of the pivotal connection between said second link and base to cause said clamping arm to more rapidly partake of its arcuate movement.

6. A clamping device of the class described comprising, a base, a handle having a bifurcated portion straddling said base and pivotally connected thereto, a clamping arm, a first connecting link, and a second connecting link, means pivotally connecting corresponding ends of said links to said base, means pivotally connecting the other end of said first link to said clamping arm intermediate its ends, means pivotally connecting the other end of said second link to the end of said clamping arm, whereby said links, during the unclamping operation, act to first raise said clamping arm and then longitudinally retract said clamping arm while imparting an arcuate movement thereto, and an actuating link pivotally connected to said handle and to said clamping arm for moving the same to clamped and unclamped positions.

7. A clamping device of the class described comprising, a base, a handle having a bifurcated portion straddling said base and pivotally connected thereto, a clamping arm, a first connecting link, and a second connecting link, means pivotally connecting corresponding ends of said links to said base, means pivotally connecting the other end of said first link to said clamping arm intermediate its ends, means pivotally connecting the other end of said second link to the end of said clamping arm, whereby said links, during the unclamping operation, act to first raise said clamping arm and then longitudinally retract said clamping arm while imparting an arcuate movement thereto, an actuating link pivotally connected to said handle and to said clamping arm for moving the same to clamped and unclamped positions, and a seat on said base adapted to be engaged by the pivotal connection between said second link and clamping arm prior to the final movement of said clamping arm into clamping position.

8. A device as described in claim 5 in which said base is provided with a seat adapted to be engaged by the pivotal connection between said second link and clamping arm during the final clamping movement of said clamping arm.

9. A clamping device of the character described comprising a base; first and second pivoted links on said base; a clamping bar having a clamping end portion, said bar being pivotally connected to said links and movable therewith between clamped and released positions; actuator means having a handle pivoted to said base, and an actuating link pivotally connected to said handle and to said clamping bar, said actuator link being operable to move said clamping bar on said links and to lock said clamping bar in the clamped position; and means forming a seat on said base engageable by said clamping bar behind the pivotal connection thereof with said actuating link as said clamping bar moves to the clamped position, said first link extending forwardly from said base and substantially parallel to said clamping bar when the latter is in the clamped position, whereby to elevate the clamping end of said bar essentially quickly during the initial unclamping movement thereof.

References Cited by the Examiner

UNITED STATES PATENTS 2,436,941    3/43    Sendoykas _____ 269—228 X

ROBERT C. RIORDON, *Primary Examiner.*

FRANK SUSKO, *Examiner.*